United States Patent Office 2,699,993
Patented Jan. 18, 1955

2,699,993

WELDING RODS FOR HARD-FACING

Samuel G. MacNeill, Kokomo, Ind., and William J. Lindner, Bethlehem, Pa., assignors to Union Carbide and Carbon Corporation, a corporation of New York No Drawing. Application June 29, 1951,
Serial No. 234,466

2 Claims. (Cl. 75—171)

The invention relates to wear-resisting alloys and has for its principal object the provision of welding rods composed of such alloys and useful for depositing a wear-resisting overlay on articles subjected to wear and abrasion in use.

The invention comprises welding rods for hard-facing composed of a nickel base alloy containing as principal constituents chromium, cobalt, molybdenum or tungsten or both, boron and carbon. Broadly, the alloy of the invention comprises 8% to 20% chromium; 8% to 20% of at least one metal selected from the group consisting of molybdenum and tungsten; 8% to 20% cobalt; 1% to 4% boron; 0.2% to 2% carbon; conventional quantities of manganese and silicon for deoxidation; up to 5% iron; the remainder nickel and incidental impurities.

Although, as indicated, tungsten or molybdenum or both may be used in the alloy of the invention, the hardest deposits are generally obtained from welding rods composed of an alloy containing tungsten without molybdenum. A preferred range of composition is: 12% to 16% chromium; 12% to 16% tungsten; 13% to 17% cobalt; 2.5% to 3.5% boron; 0.6% to 1% carbon; 1% maximum silicon; 0.25% maximum manganese; 2% maximum iron; the remainder nickel. Specific examples of compositions embodying the invention are set forth in the following table.

Percent Composition—Remainder nickel

| Cr | W | Mo | Co | B | C | Mn | Si | Fe |
|---|---|---|---|---|---|---|---|---|
| 13.10 | 11.24 | Nil | 10.97 | 3.25 | 0.68 | 0.06 | 0.29 | 1.05 |
| 13.73 | 14.23 | Nil | 11.34 | 3.09 | 0.76 | 0.05 | 0.25 | 0.75 |
| 13.89 | 13.51 | Nil | 15.07 | 2.98 | 1.08 | 0.04 | 0.61 | 1.20 |
| 13.89 | 11.95 | Nil | 16.04 | 2.90 | 0.97 | 0.03 | 0.49 | 1.00 |
| 13.69 | 13.08 | Nil | 15.12 | 2.51 | 0.94 | 0.05 | 0.28 | 0.90 |
| 13.16 | 17.25 | Nil | 16.42 | 3.07 | 0.78 | 0.07 | 0.34 | 0.87 |
| 12.95 | 19.63 | Nil | 15.99 | 3.49 | 0.88 | 0.07 | 0.32 | 0.82 |
| 13.96 | Nil | 13.83 | 14.92 | 2.96 | 0.82 | 0.07 | 0.32 | 1.77 |
| 13.95 | Nil | 14.21 | 15.74 | 3.24 | 0.85 | 0.07 | 0.34 | 1.23 |
| 14.21 | Nil | 14.02 | 15.15 | 3.34 | 0.95 | 0.08 | 0.37 | 2.50 |

The alloy of this invention is readily deposited from welding rods either by gas or electric welding methods, but is particularly adapted for use in gas-welding technique because of its relatively low melting point. Deposits so produced are sound and have excellent resistance to wear, thus protecting the surfaces of articles to which they are applied. The alloy is also suited to the production by conventional methods of castings having excellent wear-resisting properties.

What is claimed is:

1. A welding rod for hard-facing composed of an alloy containing 12% to 16% chromium; 12% to 16% tungsten; 13% to 17% cobalt; 2.5% to 3.5% boron; 0.6% to 1% carbon; up to 1% silicon; up to 0.25% manganese; up to 2% iron; the remainder nickel and incidental impurities.

2. A wear-resistant article at least the surface portions of such article exposed to wear being composed of an alloy containing 12% to 16% chromium; 12% to 16% tungsten; 13% to 17% cobalt; 2.5% to 3.5% boron; 0.6% to 1% carbon; up to 1% silicon; up to 0.25% manganese; up to 2% iron; the remainder nickel and incidental impurities.

References Cited in the file of this patent

UNITED STATES PATENTS

| | | |
|---|---|---|
| 1,602,995 | Wissler | Oct. 12, 1926 |
| 1,774,862 | Wissler | Sept. 2, 1930 |
| 2,147,636 | De Goyler | Nov. 9, 1937 |
| 2,147,637 | De Goyler | Nov. 9, 1937 |
| 2,156,757 | Grossman | July 6, 1938 |
| 2,227,065 | Charlton | Dec. 31, 1940 |
| 2,432,619 | Franks et al. | May 9, 1946 |
| 2,458,502 | Cape | Jan. 11, 1949 |
| 2,513,469 | Franks et al. | July 4, 1950 |

FOREIGN PATENTS

| | | |
|---|---|---|
| 578,097 | Great Britain | June 14, 1946 |